United States Patent [19]

Santoemma

[11] Patent Number: 5,091,458
[45] Date of Patent: Feb. 25, 1992

[54] WOOD GLUE

[75] Inventor: John Santoemma, Concord, Calif.

[73] Assignee: Findley Adhesives, Inc., Wauwatosa, Wis.

[21] Appl. No.: 482,126

[22] Filed: Feb. 15, 1990

Related U.S. Application Data

[63] Continuation-in-part of Ser. No. 192,452, May 11, 1988, abandoned.

[51] Int. Cl.$^5$ ........................ C08K 5/09; C08F 120/40
[52] U.S. Cl. ............................ 524/436; 524/437; 524/524; 524/563
[58] Field of Search ............... 524/284, 436, 437, 524, 524/557, 563

[56] References Cited

U.S. PATENT DOCUMENTS 3,135,648  6/1964  Hawkins .......................... 524/557
4,474,915 10/1984  Grinacoff ......................... 524/111

FOREIGN PATENT DOCUMENTS 747981 12/1966 Canada .
020215  6/1973 Japan .
006025  1/1974 Japan .

OTHER PUBLICATIONS

Air Products & Chemicals, Inc. brochure, "Working with Vinyl Acetate-Based Polymers", pp. 3-1 to 3-6 and 5-1 to 5-3.

Primary Examiner—Christopher Henderson
Attorney, Agent, or Firm—Godfrey & Kahn

[57] ABSTRACT

An improved wood glue containing polyvinyl acetate also contains a cross-linking catalyst comprised of aluminum chloride and a dicarboxylic acid, such as oxalic acid. The catalyst also may contain a polyvinyl alcohol and an alkaline metal chloride, such as calcium chloride, to increase the amount of dicarboxylic acid that can be absorbed.

4 Claims, No Drawings

WOOD GLUE

RELATED CASE

This application is a continuation-in-part of U.S. patent application Ser. No. 07/192,452 filed May 11, 1988 now abandoned.

FIELD OF THE INVENTION

The present invention relates to glues. More particularly, it relates to polyvinyl acetate or polyvinyl acetate copolymer based adhesives that are used to glue wood.

BACKGROUND OF THE INVENTION

Although casein glues and animal glues have been used in the past to glue wood, the most commonly used glues today for wood assembly applications are the so-called white glues and/or specialty formulated carpenter glues which are based on polyvinyl acetate homopolymers or polyvinyl acetate copolymer emulsions which may or may not contain cross-linking functionality. Some manufacturers use the white glues in edge gluing and in finger-joint bonding. Still others use these adhesives for laminating materials, such as veneer or plastics to the core of flush doors, wood or particle board.

White glues or carpenter glues stand up best in supported joints, such as dowel joints, dado joints, or mortise and tenon joints. They are not usually used in butt joints, especially if the joint must bear weight. This is because polyvinyl acetate homopolymer or copolymer is thermoplastic when not cross-linked completely, and if the bond in a butt assembly should deform because of cold flow, the assembly would slide apart.

Wood glues, including the white glues, are judged by their ability to bind to wood fiber. Ideally, the wood fiber tears before the glue bond fails. A popular on-line test for a wood glue requires that the glue bind sufficiently in 1 to 3 minutes and that there be 60% to 80% wood fiber tear when the bond is broken.

Early white glues or carpenter glues contained from 95 to 98 percent polyvinyl acetate emulsion, with the remainder made up of a plasticizer. They were sold for general-purpose household use as well as for wood bonding. However, today's commercial wood glues typically contain a polyvinyl acetate homopolymer and/or polyvinyl acetate copolymer, a polyvinyl alcohol solution, a defoamer, a plasticizer, and a preservative. They may also contain cross-linking capability, solvents, fillers or other ingredients known to those practiced in the art. These adhesives may be supplied as one or multiple component systems which may be blended prior to application in various ratios depending on specific end-use performance and "pot life" requirements.

A cross-linking catalyst for wood glue which has been used in the past was aluminum chloride (AlCl$_3$) Unfortunately for many wood assembly applications, glues containing aluminum chloride as the catalyst did not pass the "on-line" test for wood fiber tear. In addition, the resulting bond was not as heat stable or water resistant as desired. Various other cross-linking agents have been employed since but with only limited success.

Many glues commercially available for wood gluing applications work well in the laboratory, but they do not work well at the ambient temperatures encountered in the wood working factories, which can range from as low as 35° F. to as high as 120° F. In addition some of the wood glues do not possess the pot life desired which ranges from 18-24 hours.

It would be advantageous to have an adhesive that would bond wood faster and perform well at ambient temperatures encountered in a wood working factory. It also would be advantageous to have an adhesive which provides a more water and heat resistant bond than present wood glues.

BRIEF SUMMARY OF THE INVENTION

It is an object of the present invention to disclose an improved wood glue which bonds wood quickly and performs well at the temperatures encountered in a typical wood working factory.

It is a further object to disclose an improved wood glue which produces a stronger, more heat resistant and more water resistant bond.

It is further an object to disclose a unique cross-linking catalyst system for use with a wood glue. It is another object to disclose an improved wood glue system comprising a polyvinyl acetate copolymer emulsion additives and a unique cross-linking catalyst which can be added to the emulsion to provide a wood glue with desired properties.

It is a still further object to disclose a method of cross-linking a wood glue to obtain a stronger, more heat and water resistant bond for use in wood assembly applications.

The novel improved wood glue of the present invention includes a polyvinyl acetate homopolymer and/or polyvinyl acetate copolymer emulsion, additives, and a cross-linking catalyst comprising aluminum chloride, and a dicarboxylic acid, such as oxalic acid.

However, other functionally similar metal salts and/or acids may be used as necessary to accomplish the desired adhesive performance.

As previously described, the use of aluminum chloride as a catalyst is well known. However, the discovery that the addition of a dicarboxylic acid enhances and speeds up the cross-linking process is novel and unobvious. The further discovery that the addition of an alkaline metal chloride to the catalyst permits more of the dicarboxylic acid to be incorporated so that the rate of cross-linking and the film strength of the wood glue can be further increased, also is believed to be novel and unobvious.

The rate of cross-linking or curing of the adhesive can be increased or decreased by varying the amounts of aluminum chlorid and dicarboxylic acid used in the catalyst system. Thus, it is possible to tailor a wood glue to fit the requirements of a particular assembly application.

DESCRIPTION OF PREFERRED EMBODIMENT

In the preferred practice of the present invention the catalyst contains aluminum chloride as the metal salt, oxalic acid as the dicarboxylic acid and calcium chloride as the alkaline metal chloride in a tackified polyvinyl alcohol.

The polyvinyl acetate emulsion is a copolymer containing phenolic or other functional groups suitable for cross-linking. Such a polymer is available from Franklin Chemical under the trade name, Polyvac MBC.

In the preferred embodiment of the invention the improved catalyst has the following formula:

| | |
|---|---|
| Tackified Polyvinyl Alcohol | 2% to 20% |
| or | |
| Polyvinyl Alcohol | 2% to 20% |
| and | |
| Aluminum Chloride | 5% to 90% |
| Calcium Chloride | .5% to 16% |
| Oxalic Acid | 2% to 30% |
| Water as needed to obtain | 100.0% |

The catalyst may be generally prepared as follows:

The polyvinyl alcohol and water are heated, preferably to 180° F. to 190° F., and cooked until smooth and even. The mixture is cooled to 100° F. and the aluminum chloride, calcium chloride and the oxalic acid are added. The resulting mixture is heated with mild agitation to about 140° F. and mixed until all ingredients are dissolved. The mixture is then cooled and/or packaged for later use.

The ingredients which can be used in the practice of the present invention are described hereinafter.

Polyvinyl alcohol is a white, granular, water-soluble resin typically manufactured by polymerizing vinyl acetate and hydrolyzing the resultant polymer to form an alcohol.

Polyvinyl alcohol grades vary in molecular weight (degree of polymerization) and in degree of hydrolysis. The molecular weight depends on the conditions of polymerization; and the degree of hydrolysis is determined by the percent of acetate groups replaced by hydroxyl groups during the hydrolysis reaction.

Polyvinyl alcohol combines high tensile strength with ease of film formation. It bonds particularly well to cellulosic surfaces and has been used as a paper adhesive for more than 40 years. Adhesives made with polyvinyl alcohol resins have greater uniformity of physical properties and are generally more resistant to microbial attack and the effects of greases, petroleum hydrocarbons, and animal or vegetable oils than adhesives based on natural products.

Tackified polyvinyl alcohols are formed by the boration of polyvinyl alcohol resins. The tackified resins have long pot lives and are stable at relatively high temperatures. Preferably the catalyst will contain 11 to 15% of the tackified polyvinyl alcohol by weight. The polyvinyl acetate emulsions used in wood glues are the homopolymer or copolymer of vinyl acetate.

Plasticizers may be added to the adhesive formulations to lower the fusion temperature of the adhesive, increase tack, reduce brittleness, and improve film clarity.

Commonly used plasticizers are: glyceryl triacetate, dibutyl phthalate, butyl benzyl phthalate, dipropylene glycol dibenzoate, glycols (ethylene, hexylene, propylene), and other low molecular weight polymers including hydrocarbons, terpenes, rosins or their derivatives.

The aluminum chloride which is employed is the hexahydrate form supplied as a liquid at about 28% solids. The catalyst will preferably contain about 12 to 20% of aluminum chloride by weight.

The dicarboxylic acid which is employed in the catalyst is preferably oxalic acid. Other acids that may be used included malic acid, tartaric acid or mineral acids. The preferred catalyst will contain about 12% to about 16% by weight of anhydrous oxalic acid.

The alkaline metal salt which is employed is preferably calcium chloride dihydrate. In addition to $CaCl_2$, $MgCl_2$, and $ZnCl_2$, other salts can be used. The preferred catalyst will contain about 2 to about 5% by weight of the calcium chloride.

The adhesive will normally be supplied as a two component system to be combined at time of use. One component will contain the polyvinyl acetate emulsion and the other will be the catalyst system.

The complete adhesive may also contain as optional ingredients plasticizers, defoamers, fillers, preservatives and solvents which are preferably mixed with and packaged with the polyvinyl acetate emulsion.

Wood glues may be applied with hand brushes, rollers, glue guns, and in some instances, sprayers. To accommodate the different methods, the viscosity may range from 30 to 30,000 cp. Generally speaking, a wood glue having a very low viscosity will squeeze out excessively, and one having a very high viscosity will not fill voids properly. Occasionally, however, high-viscosity glues are useful for joining dowels that are dipped in the adhesive, since a minimum runoff is required. Viscosity is usually determined at room temperature on a Brookfield Viscometer, Model RVF, and which is operated at 20 rpm.

The invention is further described in the following example.

EXAMPLE I

PREFERRED CATALYST

| | |
|---|---|
| Polyvinyl Alcohol or | 7.43 |
| Tackified Polyvinyl Alcohol | |
| Aluminum Chloride | 16.90 |
| Calcium Chloride | 2.03 |
| Oxalic Acid | 13.50 |
| Water | 60.14 |
| | 100.00 |

The polyvinyl alcohol was added to the water and heated to 180° F.–190° F. It was then cooked until all the polyvinyl alcohol was dissolved. It was then cooled to 100° F., and the aluminum chloride, calcium chloride and oxalic acid were added.

The mixture was heated with mild agitation to 140° F. and mixed until all ingredients were dissolved. It was then cooled to 80° F.

The preferred catalyst as stated in Example I is then blended with a polyvinyl acetate emulsion containing phenolic or other functional groups suitable for crosslinking. One preferred emulsion is available from Franklin Chemical under the trade name Polyvac MBC.

The percentage of catalyst to the polyvinyl acetate containing component may range from 1–20 percent based on weight. The preferred percentage is 3–7%.

The resulting white glue had a pot life of about 18 to about 24 hours and was found to be superior in forming bonds to wood under the conventional "on-line" fiber tear test. The bonds also were found to possess superior heat and water resistance as compared to bonds formed with prior art wood glues.

It will be readily apparent to those skilled in the art that the foregoing example has been for purposes of illustration and that a number of modifications and changes can be made without departing from the spirit and scope of the invention.

I claim:

1. A wood glue comprising a polyvinyl acetate emulsion and a crosslinking catalyst which consists essentially of about 12% to 20% aluminum chloride and about 12% to about 16% oxalic acid by weight.

2. A wood glue of claim 1 which also contains about 5 to about 9% polyvinyl alcohol.

3. A wood glue comprising polyvinyl acetate and a catalyst consisting essentially of 2% to 20% of polyvinyl alcohol; 5% to 90% of aluminum chloride; 0.5% to 16% calcium chloride; 2% to 30% oxalic acid and water.

4. A wood glue of claim 3 which also contains polyvinyl alcohol.

* * * * *

UNITED STATES PATENT AND TRADEMARK OFFICE
CERTIFICATE OF CORRECTION

PATENT NO. : 5,091,458
DATED : February 25, 1992
INVENTOR(S) : John Santoemma

It is certified that error appears in the above—identified patent and that said Letters Patent is hereby corrected as shown below:

Column 1, Line 57, after the phrase "(AlCl3)", insert --.--;

Column 2, Line 36, after the word "and", delete "-";

Column 2, Line 51, delete the word "chlorid" and insert --chloride--.

Signed and Sealed this

Eleventh Day of May, 1993

Attest:

MICHAEL K. KIRK

Attesting Officer

Acting Commissioner of Patents and Trademarks